United States Patent [19]

Johnson

[11] E Re. 29,465

[45] Reissued Nov. 1, 1977

[54] PSORIASIS TREATMENT WITH MYCOPHENOLIC ACID

[75] Inventor: Irving S. Johnson, Indianapolis, Ind.

[73] Assignee: Eli Lilly and Company, Indianapolis, Ind.

[21] Appl. No.: 744,553

[22] Filed: Nov. 24, 1976

Related U.S. Patent Documents

Reissue of:

[64] Patent No.: 3,777,020
Issued: Dec. 4, 1973
Appl. No.: 280,626
Filed: Aug. 14, 1972

U.S. Applications:

[63] Continuation-in-part of Ser. No. 191,824, Oct. 22, 1971, abandoned, which is a continuation-in-part of Ser. No. 93,432, Nov. 27, 1970, abandoned.

[51] Int. Cl.[2] ..... A61K 31/70; A61K 31/335

[52] U.S. Cl. ..... 424/180; 424/279

[58] Field of Search ..... 424/180, 279

[56] References Cited

PUBLICATIONS

Ando et al., J. of Antibiotics, Aug. 1970, vol. 23, No. 8, pp. 408–413.

*Primary Examiner*—Jerome D. Goldberg
*Attorney, Agent, or Firm*—James L. Rowe; Arthur R. Whale

[57] ABSTRACT

Psoriasis is treated orally [and topically] with mycophenolic acid or its $\beta$-D-glucuronide.

2 Claims, No Drawings

PSORIASIS TREATMENT WITH MYCOPHENOLIC ACID

Matter enclosed in heavy brackets [ ] appears in the original patent but forms no part of this reissue specification; matter printed in italics indicates the additions made by reissue.

CROSS-REFERENCE

This application is a continuation-in-part of my copending application, Ser. No. 191,824, filed Oct. 22, 1971, now abandoned, which was in turn a continuation-in-part of my then copending application, Ser. No. 93,432, filed Nov. 27, 1970, now abandoned.

BACKGROUND OF THE INVENTION

Psoriasis is a common chronic skin disease whose cause is unknown. It is characterized by persistent patches of redness covered with scales. The disease is in part determined by a genetically dominant trait. While it is absent at birth, it can begin at any age from childhood to extreme old age. Psoriasis does not, however, appear to be a communicable disease and there are no known causative factors for it in the environment.

In the involved patches, the cells of the epidermis grow and multiply up to seven times faster than normal. The agents currently used for treatment of psoriasis include ultraviolet light, coal tar, ammoniated mercury, anthralin, and topical corticosteroids. Methotrexate has been used to treat psoriasis by systemic administration, but such treatment method is accompanied by all the side effects commonly encountered with its use for other conditions. Antimetabolite drugs such as aminopterin, thioguanine, and azaribine have also been used in treating this disease. Systemic corticosteroids or antimalarial drugs such as chloroquin may aggravate psoriasis by mechanisms that are not understood. A low relative humdity also aggravates the disease, probably by allowing desiccation of the skin and irritation.

It would, of course, be desirable to employ a topical treatment, for psoriasis, but according to Comaish and Juhlin, Arch. Dermatol. 100, 99 (1969) methotrexate, a drug of choice in severe cases, was not successful in treating psoriasis by the topical route. In fact, of the antimetabolite drugs, fluorouracil alone has been claimed to be effective in treating psoriasis by topical administration—see Z. Haut-Geschlechtskrankh 44, 361 (1969).

Mycophenolic acid is produced by various strains of fungi of the Penicillium brevicompactum, Penicillium stoloniferum and Penicillium urtichae groups. The compound was the first biologically-active compound isolated from a mold. The initial isolation was carried out by Gosio in 1896 (Gosio, Rivista d'Igiene e Sanita' pubblica, Ann. 7, 825, 869, 961 [1896]. Structure work was effected largely through the efforts of Raistrick et al. from 1932 to 1935 (Raistrick et al., Biochem. J. 26, 1441 [1932]; Biochem J. 27, 654 [1933]).

Mycophenolic acid is known to exhibit antifungal, antiviral and antibacterial activity. [See for example, J. Gen. Virol. 4, 629 (1969); J. Antibiotics, 22, 297 (1969).]

Mycophenolic acid β-D-glucuronide is described by Ando et al. in J. Antibiotics, 23, 408 (1970) and its antitumor activity is set forth in that same article.

SUMMARY OF THE INVENTION

This invention provides a method of treating psoriasis comprising administering to a human suffering from psoriasis an effective amount of a compound of the formula:

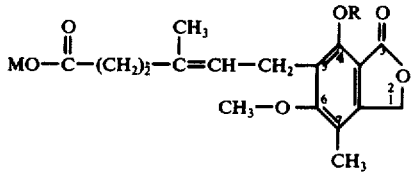

wherein M is hydrogen, potassium, sodium or ammonium and R is hydrogen or β-D-glucuronidyl

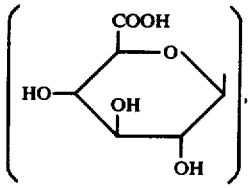

When M is hydrogen and R is hydrogen, the above compound is named systematically as 6-[4-hdyroxy-7-methyl-6-methoxy-3-oxo-5-phthalanyl]-4-methyl-4-hexenoic acid or mycophenolic acid. When R is β-D-glucuronidyl and M is hydrogen, the resulting compound is mycophenolic acid β-D-glucuronide or, systematically, 6-[4-(β-D-glucopyranosylglucuronate)-4-methyl-6-methoxy-3oxo-5-phthalanyl]-4-methyl-4-hexenoic acid. The useful alkali metal salts include the sodium, potassium, and the like salts.

Mycophenolic acid, mycophenolic acid β-D-glucuronide or salts thereof can be administered to the human suffering from psoriasis [either] orally [or topically. In the latter instance, an effective amount of mycophenolic acid or of its β-D-glucuronide for treating psoriasis is applied directly to the psoriatic lesion]. For oral use, mycophenolic acid, its β-D-glucuronide, or salts thereof are administered by that route in tablets or capsules or as a liquid solution or suspension. A preferred mode for oral administration is via gelatin capsules. A typical formulation in capsules is as follows: 9.4 kg. of mycophenolic acid isolated from a fermentation medium is thoroughly mixed with 4.7 kg. of starch and the mixture loaded into empty telescoping gelatin capsules. Each capsule contains the following ingredients:

400 mg. mycophenolic acid
200 mg. starch

[For topical use, mycophenolic acid, its β-D-glucuronide or a salt of either is formulated as an ointment or in solution.]

[A typical ointment useful in applying a compound of the above formula to a psoriatic lesion contains the following ingredients per gram of ointment:]

[

| | Mg. |
|---|---|
| Mycophenolic acid | 50 |
| Polyethylene glycol 300 (N.F.) | 600 |
| Polyethylene glycol 4000 (U.S.P.) | 350 |

]

[A typical solution contains the following ingredients per gram of solution:]

| | Mg. |
|---|---|
| Mycophenolic acid | 50 |
| Polyethylene glycol 300 (N.F.) | 950 |

In any of the above formulations, mycophenolic acid β-D-glucuronide, prepared by the method of Ando et al. (supra) can be substituted for mycophenolic acid.

In carrying out [one aspect of] my novel treatment method, [mycophenolic acid or mycophenolic acid β-D-glucuronide formulated as an ointment or solution as indicated above, is applied to a psoriatic lesion at a rate varying from 3 mcg. per square cm. of skin surface per day up to 300 mcg. per square cm. of skin surface per day until the psoriatic process is checked. The ointment or solution can be applied daily for 14 days using a continuous occlusive dressing. The concentration of mycophenolic acid or of its glucuronide in the ointment or solution can vary from 0.05 percent to 5 percent; with these concentrations a dose of 0.01 ml. per square cm. of skin surface readily supplies the amount of mycophenolic acid or of its glucuronide specified above. The daily topical dose for a 70 kgm. person should not exceed about 1.5 g. of either agent. Both mycophenolic acid and its glucuronide are relatively nontoxic.]

[However,] if oral administration is desirable, a daily dosage of from 1 to 10 gm. in divided dosages 3 or 4 times per day of either mycophenolic acid or of mycophenolic acid β-D-glucuronide can be employed, using any of the commonly accepted oral dosage forms.

In the above formulations it has been stated that it is preferred to employ the drug in the form of the free acid; however, the sodium, potassium or ammonium salts are also effective. Formulations employed for the salts are substantially the same as those indicated above for the free acid.

Patients suffering from psoriasis who have been treated for their disease by a regimen involving oral administration of 4.8 g. of mycophenolic acid per day have shown marked improvement of their psoriatic lesions after treatment periods of from 2 to 3 weeks.

I claim:

1. A method of treating psoriasis comprising the *oral* administration to a human suffering from psoriasis [either orally or topically] of an effective amount for treating psoriasis of a compound of the formula:

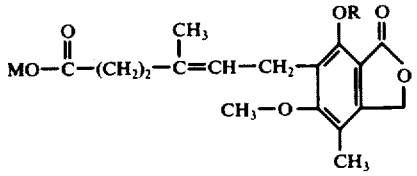

wherein M is hydrogen, sodium, potassium or ammonium and R is hydrogen or β-D-glucuronidyl.

[2. A method according to claim 1 wherein a compound of the formula:

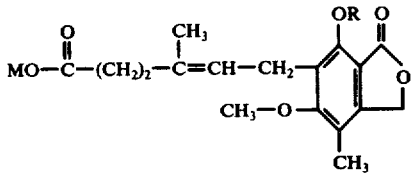

wherein M is hydrogen, sodium, potassium or ammonium and R is hydrogen or β-D-glucuronidyl is applied topically to the psoriatic lesion in an amount from 3 mcg. to 300 mcg. per cm.$^2$ of lesion per day.]

3. A method according to claim 1 wherein from 1 to 10 gm. per day in divided doses of a compound of the formula:

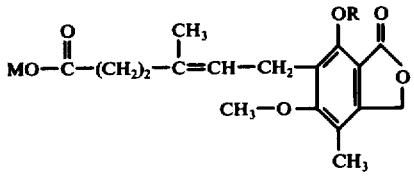

wherein M is hydrogen, sodium, potassium or ammonium and R is hydrogen or β-D-glucuronidyl is administered by the oral route to a human suffering from psoriasis.

* * * * *